(No Model.)
T. CROW.
Machine for Cutting Basket Splints.
No. 239,368. Patented March 29, 1881.
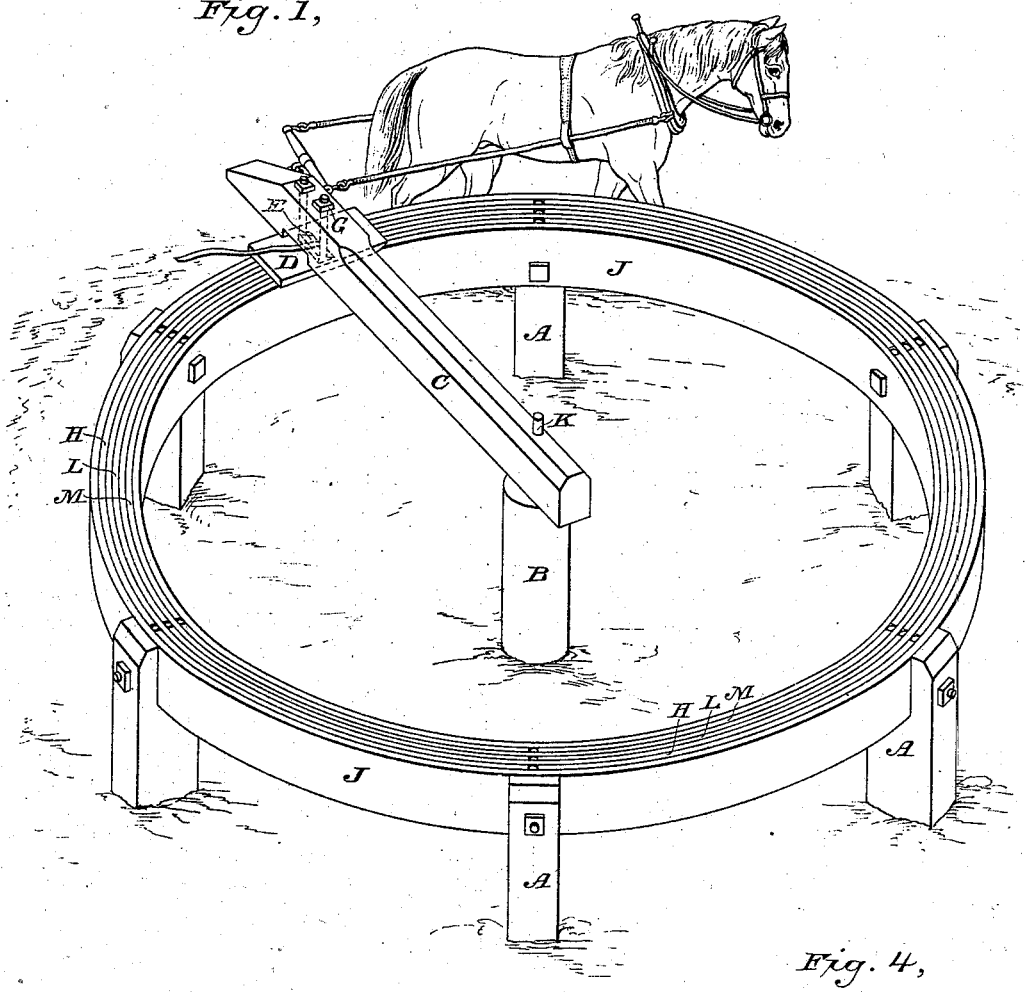
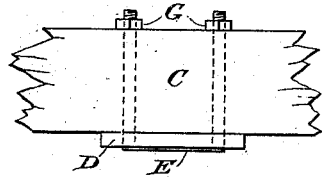
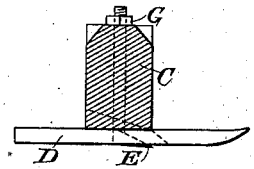
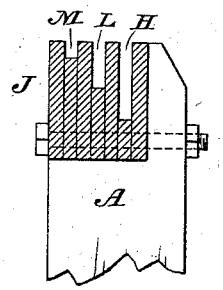
WITNESSES
Geo. W. Breck.
Wm. A. Skinkle
INVENTOR
Thomas Crow,
By his Attorneys Baldwin, Hopkins, & Peyton
N. PETERS, PHOTO-LITHOGRAPHER, WASHINGTON, D.C.

UNITED STATES PATENT OFFICE.

THOMAS CROW, OF KAUFMAN COUNTY, TEXAS.

MACHINE FOR CUTTING BASKET-SPLINTS.

SPECIFICATION forming part of Letters Patent No. 239,368, dated March 29, 1881.

Application filed December 20, 1880. (No model.)

*To all whom it may concern:*

Be it known that I, THOMAS CROW, a citizen of the United States, residing in Kaufman county, State of Texas, have invented a new and useful Machine for Cutting Basket-Splints, of which the following is a specification.

The object of my invention is to produce a simple, cheap, and effective machine, which can readily be transported, set up, and taken apart, and one which, on account of its simplicity, can be used by persons unskilled in mechanics.

In the accompanying drawings, Figure 1 is a perspective view of my improved machine. Figs. 2 and 3 are detail views, showing the cutting-knife and its attachment to the sweep; and Fig. 4 is a sectional view of the circular bed or platform.

The circular bed J is supported upon any suitable number of standards A, which are sunk in the ground on the line of a circle, of which circle the standard B is the center. The bed J is shown as composed of a series of planks or pieces of timber placed on edge and firmly secured together and in place by the bolts passing through them and the standards A. The alternate planks or timbers in the bed J are of a height different from each other and less than the adjoining planks, so that a series of grooves or recesses, H L M, are formed in the circular bed. By constructing the bed in this manner it can readily be set up and taken apart, and can be packed in a comparatively small space; but it might be made in other ways without departing from part of my invention.

The sweep C turns upon a vertical pivot, K, on the standard B. A knife, E, is secured by bolts upon the sweep, so that as the sweep is carried around the knife moves over the circular bed J. A runner or slide, D, through which the knife projects after the manner of the cutting-edge of a plane, is also secured upon the sweep C. This slide is beveled at one end, as shown, so that it will raise the sweep and knife where it comes in contact with the end of the plank to be reduced. The splint as it is cut issues from the aperture in the slide as shavings do from a plane, as shown in Fig. 1. The thickness of splint to be cut is regulated by means of the nuts G G. The sweep must be heavy enough to hold the knife down to its work, so as to insure a uniform cut.

The bed of the machine is divided into sections of any desired length by blocks or stops, against which the planks to be reduced abut.

The operation of the machine is as follows: The planks or pieces of timber to be reduced to splints are first inserted in the deepest groove, and the thickness of splint desired having been adjusted the sweep is drawn around by horse-power until the projecting parts of the planks have been cut away. The planks are then removed from the groove and inserted in the next deepest groove, and so on until the planks have been entirely reduced to basket-splints.

The bed of the machine is supported at a sufficient height to secure a level strain from the shoulders of the horse.

It will be seen that by my machine basket-splints can be cut by a continuous circular movement of the sweep.

Having thus described my invention, what I claim as new, and desire to secure by Letters Patent, is—

1. The combination, substantially as herein set forth, of the circular bed having a series of grooves of different depths in its upper surface in the direction of its periphery, for the purpose set forth, the sweep turning upon a pivot at or about the center of the bed, and a cutting-knife on the sweep which passes over the bed as the sweep is moved around.

2. The combination of the supports with the timbers or planks of different widths, resting on edge upon the supports and secured in place thereon by bolts and nuts, the whole constituting a circular bed having a series of grooves, H L M, of different depths, for the purpose set forth.

THOS. CROW.

Witnesses:
T. T. SMITH,
A. S. SELF.